United States Patent [19]
Deschaine et al.

[11] Patent Number: 5,883,898
[45] Date of Patent: Mar. 16, 1999

[54] APPARATUS AND METHOD FOR MAPPING E1 SIGNALS INTO A DIGITAL CROSS-CONNECT MATRIX SPACE

[75] Inventors: Stephen A. Deschaine, Garland; Manouchehr Entezari, Flower Mound; Mark J. Nietubyc, Plano; Werner L. Heissenhuber, Carrollton, all of Tex.

[73] Assignee: Alcatel USA Sourcing, L.P., Plano, Tex.

[21] Appl. No.: 673,102

[22] Filed: Jul. 1, 1996

[51] Int. Cl.$^6$ ...................................................... H04J 3/02
[52] U.S. Cl. ........................... 370/467; 370/476; 370/506
[58] Field of Search ..................... 370/465, 468, 370/476, 477, 503, 505, 506, 509, 907, 466, 467; 340/825.79, 825.8; 359/115.117, 118

[56] References Cited

U.S. PATENT DOCUMENTS

| | | | |
|---|---|---|---|
| 4,839,893 | 6/1989 | Smith | 370/506 |
| 4,967,405 | 10/1990 | Upp et al. | 370/465 |
| 5,040,170 | 8/1991 | Upp et al. | 370/466 |
| 5,077,735 | 12/1991 | Myung et al. | 370/467 |
| 5,282,195 | 1/1994 | Hood et al. | 370/503 |
| 5,315,594 | 5/1994 | Noser | 370/353 |
| 5,365,518 | 11/1994 | Noser | 370/395 |
| 5,526,359 | 6/1996 | Read et al. | 370/516 |
| 5,675,580 | 10/1997 | Lyon et al. | 370/503 |

FOREIGN PATENT DOCUMENTS

| | | | |
|---|---|---|---|
| 2061673 | 5/1981 | United Kingdom | H04L 13/08 |
| 2151437 | 7/1985 | United Kingdom | H04J 3/06 |

OTHER PUBLICATIONS

PCT Search Report, dated Nov. 3, 1997.

*Primary Examiner*—Alpus H. Hsu
*Attorney, Agent, or Firm*—Baker & Botts, L.L.P.

[57] ABSTRACT

Apparatus and method are provided which map E1 signals into a logical space of a predetermined number of DS1 signals. 24 selected DS0 signals that are part of the first E1 signal are mapped into the space of a first DS1 signal in the logical space. The 8 DS0 signals of the first E1 signal are then mapped into the space of a second DS1 signal in the logical space. Depending on the defined logical space, additional E1 signals may be mapped into the logical space of two DS1 signals in the same manner until the predetermined number of DS1 signal spaces in the defined logical space are filled.

21 Claims, 8 Drawing Sheets

| DS1-1 | DS1-2 | DS1-3 | DS1-4 | DS1-5 | DS1-6 | DS1-7 | DS1-8 | DS1-9 TO DS1-24 | DS1-25 | DS1-26 | DS1-27 | DS1-28 |
|---|---|---|---|---|---|---|---|---|---|---|---|---|
| DS0-00,1 | DS0-00,2 | DS0-00,3 | DS0-00,4 | DS0-00,5 | DS0-00,6 | DS0-00,7 | DS0-00,8 | ∘∘∘ | DS0-00,25 | DS0-00,26 | DS0-00,27 | DS0-00,28 |
| DS0-01,1 | DS0-01,2 | DS0-01,3 | DS0-01,4 | DS0-01,5 | DS0-01,6 | DS0-01,7 | DS0-01,8 | ∘∘∘ | DS0-01,25 | DS0-01,26 | DS0-01,27 | DS0-01,28 |
| DS0-02,1 | DS0-02,2 | DS0-02,3 | DS0-02,4 | DS0-02,5 | DS0-02,6 | DS0-02,7 | DS0-02,8 | ∘∘∘ | DS0-02,25 | DS0-02,26 | DS0-02,27 | DS0-02,28 |
| DS0-03,1 | DS0-03,2 | DS0-03,3 | DS0-03,4 | DS0-03,5 | DS0-03,6 | DS0-03,7 | DS0-03,8 | ∘∘∘ | DS0-03,25 | DS0-03,26 | DS0-03,27 | DS0-03,28 |
| DS0-04,1 | DS0-04,2 | DS0-04,3 | DS0-04,4 | DS0-04,5 | DS0-04,6 | DS0-04,7 | DS0-04,8 | ∘∘∘ | DS0-04,25 | DS0-04,26 | DS0-04,27 | DS0-04,28 |
| DS0-05,1 | DS0-05,2 | DS0-05,3 | DS0-05,4 | DS0-05,5 | DS0-05,6 | DS0-05,7 | DS0-05,8 | ∘∘∘ | DS0-05,25 | DS0-05,26 | DS0-05,27 | DS0-05,28 |
| DS0-06,1 | DS0-06,2 | DS0-06,3 | DS0-06,4 | DS0-06,5 | DS0-06,6 | DS0-06,7 | DS0-06,8 | ∘∘∘ | DS0-06,25 | DS0-06,26 | DS0-06,27 | DS0-06,28 |
| DS0-07,1 | DS0-07,2 | DS0-07,3 | DS0-07,4 | DS0-07,5 | DS0-07,6 | DS0-07,7 | DS0-07,8 | ∘∘∘ | DS0-07,25 | DS0-07,26 | DS0-07,27 | DS0-07,28 |
| DS0-08,1 | DS0-08,2 | DS0-08,3 | DS0-08,4 | DS0-08,5 | DS0-08,6 | DS0-08,7 | DS0-08,8 | ∘∘∘ | DS0-08,25 | DS0-08,26 | DS0-08,27 | DS0-08,28 |
| DS0-09,1 | DS0-09,2 | DS0-09,3 | DS0-09,4 | DS0-09,5 | DS0-09,6 | DS0-09,7 | DS0-09,8 | ∘∘∘ | DS0-09,25 | DS0-09,26 | DS0-09,27 | DS0-09,28 |
| DS0-10,1 | DS0-10,2 | DS0-10,3 | DS0-10,4 | DS0-10,5 | DS0-10,6 | DS0-10,7 | DS0-10,8 | ∘∘∘ | DS0-10,25 | DS0-10,26 | DS0-10,27 | DS0-10,28 |
| DS0-11,1 | DS0-11,2 | DS0-11,3 | DS0-11,4 | DS0-11,5 | DS0-11,6 | DS0-11,7 | DS0-11,8 | ∘∘∘ | DS0-11,25 | DS0-11,26 | DS0-11,27 | DS0-11,28 |
| DS0-12,1 | DS0-12,2 | DS0-12,3 | DS0-12,4 | DS0-12,5 | DS0-12,6 | DS0-12,7 | DS0-12,8 | ∘∘∘ | DS0-12,25 | DS0-12,26 | DS0-12,27 | DS0-12,28 |
| DS0-13,1 | DS0-13,2 | DS0-13,3 | DS0-13,4 | DS0-13,5 | DS0-13,6 | DS0-13,7 | DS0-13,8 | ∘∘∘ | DS0-13,25 | DS0-13,26 | DS0-13,27 | DS0-13,28 |
| DS0-14,1 | DS0-14,2 | DS0-14,3 | DS0-14,4 | DS0-14,5 | DS0-14,6 | DS0-14,7 | DS0-14,8 | ∘∘∘ | DS0-14,25 | DS0-14,26 | DS0-14,27 | DS0-14,28 |
| DS0-15,1 | DS0-15,2 | DS0-15,3 | DS0-15,4 | DS0-15,5 | DS0-15,6 | DS0-15,7 | DS0-15,8 | ∘∘∘ | DS0-15,25 | DS0-15,26 | DS0-15,27 | DS0-15,28 |
| DS0-16,1 | DS0-16,2 | DS0-16,3 | DS0-16,4 | DS0-16,5 | DS0-16,6 | DS0-16,7 | DS0-16,8 | ∘∘∘ | DS0-16,25 | DS0-16,26 | DS0-16,27 | DS0-16,28 |
| DS0-17,1 | DS0-17,2 | DS0-17,3 | DS0-17,4 | DS0-17,5 | DS0-17,6 | DS0-17,7 | DS0-17,8 | ∘∘∘ | DS0-17,25 | DS0-17,26 | DS0-17,27 | DS0-17,28 |
| DS0-18,1 | DS0-18,2 | DS0-18,3 | DS0-18,4 | DS0-18,5 | DS0-18,6 | DS0-18,7 | DS0-18,8 | ∘∘∘ | DS0-18,25 | DS0-18,26 | DS0-18,27 | DS0-18,28 |
| DS0-19,1 | DS0-19,2 | DS0-19,3 | DS0-19,4 | DS0-19,5 | DS0-19,6 | DS0-19,7 | DS0-19,8 | ∘∘∘ | DS0-19,25 | DS0-19,26 | DS0-19,27 | DS0-19,28 |
| DS0-20,1 | DS0-20,2 | DS0-20,3 | DS0-20,4 | DS0-20,5 | DS0-20,6 | DS0-20,7 | DS0-20,8 | ∘∘∘ | DS0-20,25 | DS0-20,26 | DS0-20,27 | DS0-20,28 |
| DS0-21,1 | DS0-21,2 | DS0-21,3 | DS0-21,4 | DS0-21,5 | DS0-21,6 | DS0-21,7 | DS0-21,8 | ∘∘∘ | DS0-21,25 | DS0-21,26 | DS0-21,27 | DS0-21,28 |
| DS0-22,1 | DS0-22,2 | DS0-22,3 | DS0-22,4 | DS0-22,5 | DS0-22,6 | DS0-22,7 | DS0-22,8 | ∘∘∘ | DS0-22,25 | DS0-22,26 | DS0-22,27 | DS0-22,28 |
| DS0-23,1 | DS0-23,2 | DS0-23,3 | DS0-23,4 | DS0-23,5 | DS0-23,6 | DS0-23,7 | DS0-23,8 | ∘∘∘ | DS0-23,25 | DS0-23,26 | DS0-23,27 | DS0-23,28 |

| E1-1 | E1-2 | E1-3 | E1-4 | E1-5 TO E1-12 | E1-13 | E1-14 |
|---|---|---|---|---|---|---|
| DSO-01,1 | DSO-00,1 | | | | | DSO-00,14 |
| DSO-02,1 | DSO-01,2 | DSO-00,3 | DSO-00,4 | ∘ ∘ ∘ | DSO-00,13 | DSO-01,14 |
| DSO-03,1 | DSO-02,2 | DSO-01,3 | DSO-01,4 | ∘ ∘ ∘ | DSO-01,13 | DSO-02,14 |
| DSO-05,1 | DSO-03,2 | DSO-02,3 | DSO-02,4 | ∘ ∘ ∘ | DSO-02,13 | DSO-03,14 |
| DSO-06,1 | DSO-04,2 | DSO-03,3 | DSO-03,4 | ∘ ∘ ∘ | DSO-03,13 | DSO-04,14 |
| DSO-07,1 | DSO-05,2 | DSO-04,3 | DSO-04,4 | ∘ ∘ ∘ | DSO-05,13 | DSO-05,14 |
| DSO-09,1 | DSO-06,2 | DSO-05,3 | DSO-05,4 | ∘ ∘ ∘ | DSO-06,13 | DSO-06,14 |
| DSO-10,1 | DSO-07,2 | DSO-06,3 | DSO-06,4 | ∘ ∘ ∘ | DSO-07,13 | DSO-07,14 |
| DSO-11,1 | DSO-08,2 | DSO-07,3 | DSO-07,4 | ∘ ∘ ∘ | DSO-08,13 | DSO-08,14 |
| DSO-13,1 | DSO-09,2 | DSO-08,3 | DSO-08,4 | ∘ ∘ ∘ | DSO-09,13 | DSO-09,14 |
| DSO-14,1 | DSO-10,2 | DSO-09,3 | DSO-09,4 | ∘ ∘ ∘ | DSO-10,13 | DSO-10,14 |
| DSO-15,1 | DSO-11,2 | DSO-10,3 | DSO-10,4 | ∘ ∘ ∘ | DSO-11,13 | DSO-11,14 |
| DSO-17,1 | DSO-12,2 | DSO-11,3 | DSO-11,4 | ∘ ∘ ∘ | DSO-12,13 | DSO-12,14 |
| DSO-18,1 | DSO-13,2 | DSO-12,3 | DSO-12,4 | ∘ ∘ ∘ | DSO-13,13 | DSO-13,14 |
| DSO-19,1 | DSO-14,2 | DSO-13,3 | DSO-13,4 | ∘ ∘ ∘ | DSO-14,13 | DSO-14,14 |
| DSO-21,1 | DSO-15,2 | DSO-14,3 | DSO-14,4 | ∘ ∘ ∘ | DSO-15,13 | DSO-15,14 |
| DSO-22,1 | DSO-16,2 | DSO-15,3 | DSO-15,4 | ∘ ∘ ∘ | DSO-16,13 | DSO-16,14 |
| DSO-23,1 | DSO-17,2 | DSO-16,3 | DSO-16,4 | ∘ ∘ ∘ | DSO-17,13 | DSO-17,14 |
| DSO-25,1 | DSO-18,2 | DSO-17,3 | DSO-17,4 | ∘ ∘ ∘ | DSO-18,13 | DSO-18,14 |
| DSO-26,1 | DSO-19,2 | DSO-18,3 | DSO-18,4 | ∘ ∘ ∘ | DSO-19,13 | DSO-19,14 |
| DSO-27,1 | DSO-20,2 | DSO-19,3 | DSO-19,4 | ∘ ∘ ∘ | DSO-20,13 | DSO-20,14 |
| DSO-29,1 | DSO-21,2 | DSO-20,3 | DSO-20,4 | ∘ ∘ ∘ | DSO-21,13 | DSO-21,14 |
| DSO-30,1 | DSO-22,2 | DSO-21,3 | DSO-21,4 | ∘ ∘ ∘ | DSO-22,13 | DSO-22,14 |
| DSO-31,1 | DSO-23,2 | DSO-22,3 | DSO-22,4 | ∘ ∘ ∘ | DSO-23,13 | DSO-23,14 |
| | DSO-24,2 | DSO-23,3 | DSO-23,4 | ∘ ∘ ∘ | DSO-24,13 | DSO-24,14 |
| | DSO-25,2 | DSO-24,3 | DSO-24,4 | ∘ ∘ ∘ | DSO-25,13 | DSO-25,14 |
| | DSO-26,2 | DSO-25,3 | DSO-25,4 | ∘ ∘ ∘ | DSO-26,13 | DSO-26,14 |
| | DSO-27,2 | DSO-26,3 | DSO-26,4 | ∘ ∘ ∘ | DSO-27,13 | DSO-27,14 |
| | DSO-28,2 | DSO-27,3 | DSO-27,4 | ∘ ∘ ∘ | DSO-28,13 | DSO-28,14 |
| | DSO-29,2 | DSO-28,3 | DSO-28,4 | ∘ ∘ ∘ | DSO-29,13 | DSO-29,14 |
| | DSO-30,2 | DSO-29,3 | DSO-29,4 | ∘ ∘ ∘ | DSO-30,13 | DSO-30,14 |
| | DSO-31,2 | DSO-30,3 | DSO-30,4 | ∘ ∘ ∘ | DSO-31,13 | DSO-31,14 |
| | | DSO-31,3 | DSO-31,4 | ∘ ∘ ∘ | | |

FIG. 6

| E1-1 | E1-2 | E1-3 | E1-4 | E1-5 | E1-6 | E1-7 TO E1-18 | E1-19 | E1-20 | E1-21 |
|---|---|---|---|---|---|---|---|---|---|
| DS0-01,1 | DS0-00,1 | DS0-01,3 | DS0-01,4 | DS0-01,5 | DS0-01,6 | ° ° ° | DS0-01,19 | DS0-01,20 | DS0-01,21 |
| DS0-02,1 | DS0-00,2 | DS0-02,3 | DS0-02,4 | DS0-02,5 | DS0-02,6 | ° ° ° | DS0-02,19 | DS0-02,20 | DS0-02,21 |
| DS0-03,1 | DS0-00,3 | DS0-03,3 | DS0-03,4 | DS0-03,5 | DS0-03,6 | ° ° ° | DS0-03,19 | DS0-03,20 | DS0-03,21 |
| DS0-05,1 | DS0-04,1 | DS0-05,3 | DS0-05,4 | DS0-05,5 | DS0-05,6 | ° ° ° | DS0-05,19 | DS0-05,20 | DS0-05,21 |
| DS0-06,1 | DS0-04,2 | DS0-06,3 | DS0-06,4 | DS0-06,5 | DS0-06,6 | ° ° ° | DS0-06,19 | DS0-06,20 | DS0-06,21 |
| DS0-07,1 | DS0-04,3 | DS0-07,3 | DS0-07,4 | DS0-07,5 | DS0-07,6 | ° ° ° | DS0-07,19 | DS0-07,20 | DS0-07,21 |
| DS0-09,1 | DS0-08,1 | DS0-09,3 | DS0-09,4 | DS0-09,5 | DS0-09,6 | ° ° ° | DS0-09,19 | DS0-09,20 | DS0-09,21 |
| DS0-10,1 | DS0-08,2 | DS0-10,3 | DS0-10,4 | DS0-10,5 | DS0-10,6 | ° ° ° | DS0-10,19 | DS0-10,20 | DS0-10,21 |
| DS0-11,1 | DS0-08,3 | DS0-11,3 | DS0-11,4 | DS0-11,5 | DS0-11,6 | ° ° ° | DS0-11,19 | DS0-11,20 | DS0-11,21 |
| DS0-13,1 | DS0-12,1 | DS0-13,3 | DS0-13,4 | DS0-13,5 | DS0-13,6 | ° ° ° | DS0-13,19 | DS0-13,20 | DS0-13,21 |
| DS0-14,1 | DS0-12,2 | DS0-14,3 | DS0-14,4 | DS0-14,5 | DS0-14,6 | ° ° ° | DS0-14,19 | DS0-14,20 | DS0-14,21 |
| DS0-15,1 | DS0-12,3 | DS0-15,3 | DS0-15,4 | DS0-15,5 | DS0-15,6 | ° ° ° | DS0-15,19 | DS0-15,20 | DS0-15,21 |
| DS0-17,1 | DS0-16,1 | DS0-17,3 | DS0-17,4 | DS0-17,5 | DS0-17,6 | ° ° ° | DS0-17,19 | DS0-17,20 | DS0-17,21 |
| DS0-18,1 | DS0-16,2 | DS0-18,3 | DS0-18,4 | DS0-18,5 | DS0-18,6 | ° ° ° | DS0-18,19 | DS0-18,20 | DS0-18,21 |
| DS0-19,1 | DS0-16,3 | DS0-19,3 | DS0-19,4 | DS0-19,5 | DS0-19,6 | ° ° ° | DS0-19,19 | DS0-19,20 | DS0-19,21 |
| DS0-21,1 | DS0-20,1 | DS0-21,3 | DS0-21,4 | DS0-20,5 | DS0-21,6 | ° ° ° | DS0-21,19 | DS0-21,20 | DS0-21,21 |
| DS0-22,1 | DS0-20,2 | DS0-22,3 | DS0-22,4 | DS0-22,5 | DS0-22,6 | ° ° ° | DS0-22,19 | DS0-22,20 | DS0-22,21 |
| DS0-23,1 | DS0-20,3 | DS0-23,3 | DS0-23,4 | DS0-23,5 | DS0-23,6 | ° ° ° | DS0-23,19 | DS0-23,20 | DS0-23,21 |
| DS0-25,1 | DS0-24,1 | DS0-25,3 | DS0-25,4 | DS0-25,5 | DS0-25,6 | ° ° ° | DS0-25,19 | DS0-25,20 | DS0-25,21 |
| DS0-26,1 | DS0-24,2 | DS0-26,3 | DS0-26,4 | DS0-24,5 | DS0-26,6 | ° ° ° | DS0-26,19 | DS0-26,20 | DS0-26,21 |
| DS0-27,1 | DS0-24,3 | DS0-27,3 | DS0-27,4 | DS0-24,6 | DS0-27,6 | ° ° ° | DS0-27,19 | DS0-27,20 | DS0-27,21 |
| DS0-29,1 | DS0-28,1 | DS0-29,3 | DS0-29,4 | DS0-28,4 | DS0-29,6 | ° ° ° | DS0-29,19 | DS0-29,20 | DS0-29,21 |
| DS0-30,1 | DS0-28,2 | DS0-30,3 | DS0-30,4 | DS0-28,5 | DS0-30,6 | ° ° ° | DS0-30,19 | DS0-30,20 | DS0-30,21 |
| DS0-31,1 | DS0-28,3 | DS0-31,3 | DS0-31,4 | DS0-28,6 | DS0-31,6 | ° ° ° | DS0-31,19 | DS0-31,20 | DS0-31,21 |

APPARATUS AND METHOD FOR MAPPING E1 SIGNALS INTO A DIGITAL CROSS-CONNECT MATRIX SPACE

TECHNICAL FIELD OF THE INVENTION

This invention is related in general to the field of telecommunications systems. More particularly, the invention is related to apparatus for mapping E1 signals into a digital cross-connect matrix space and method therefor.

BACKGROUND OF THE INVENTION

In the early days of telecommunication, a copper wire medium was used to carry a single information channel. Because the greatest proportion of cost is in the materials and construction of the physical link, telephony engineers have developed ways to pack multiple channels onto a single physical link. Frequency division multiplexing (FDM) and time division multiplexing (TDM) have been devised to multiplex multiple streams of analog and pulse code modulation (PCM) digital signals, respectively, into one. For digital signals, the time division multiplexing hierarchy is DS0 through DS4, where a DS0 is a single 0.064 Mbps channel and a DS4 is 4,032 message channels (DS0s) multiplexed together.

A similar time division multiplexing scheme is used in international telephone systems based on 32-channel format. The international digital systems, based on International Telecommunication Union CCITT's G.700 Series Recommendations, are commonly called E1 or CEPT-1. The E1 signals are based on blocks of 32 channels or time slots, of which time slot 0 and time slot 16 are typically used for control and signaling, respectively.

In today's telecommunications network, digital cross-connect (DCS) systems typically reside at the central office as part of the telecommunications carrier or transmission network. Digital cross-connect systems are the interconnection points for terminals, multiplexers, and transmission facilities. The digital cross-connect system may be a non-blocking matrix that remaps DS1 signals electronically at the DS0 level. There is an increased interest to broaden the application of the digital cross-connect system to end office operations and to interface directly with E1 signals, in particular, for international applications.

SUMMARY OF THE INVENTION

Accordingly, there is a need for apparatus and a method for mapping E1 signals into a digital cross-connect matrix space. E1 signal mapping is needed when an interface unit is provided as a gateway between a digital cross-connect system and a digital loop carrier, which is coupled to subscriber lines carrying E1 signals.

In accordance with the present invention, 14 E1 signals are mapped into the matrix space of a digital cross-connect.

In one aspect of the invention, a method is provided which map E1 signals into a logical space of a predetermined number of DS1 signals. 24 selected DS0 signals that are part of the first E1 signal are mapped into the space of a first DS1 signal in the logical space. The eight remaining DS0 signals of the first E1 signal are then mapped into the space of a second DS1 signal in the logical space. Depending on the defined logical space, additional E1 signals may be mapped into the logical space of two DS1 signals in the same manner until the predetermined number of DS1 signal spaces in the defined logical space are filled.

In another aspect of the invention, there is provided apparatus for mapping E1 signals into a matrix space. The apparatus includes a matrix interface for defining the matrix space as having a predetermined number of DS1 signals, mapping 24 selected DS0 signals partially comprising the first E1 signal into the space of a first DS1 signal in the matrix space, mapping remaining eight DS0 signals partially comprising the first E1 signal into the space of a second DS1 signal in the matrix space, and continuing the two mapping steps until the DS1 spaces in the defined matrix space are filled.

BRIEF DESCRIPTION OF THE DRAWINGS

For a better understanding of the present invention, reference may be made to the accompanying drawings, in which:

FIG. 5 is an exemplary mapping diagram of mapping 28 DS1 signals into the DS0 logical space of the digital cross-connect matrix;

FIG. 6 is an exemplary mapping diagram of mapping 14 E1 signals into the DS0 logical space of the digital cross-connect matrix;

FIG. 7 is an exemplary mapping diagram of mapping 21 E1 signals into the DS0 logical space of the digital cross-connect matrix;

DETAILED DESCRIPTION OF THE INVENTION

The preferred embodiment(s) of the present invention is (are) illustrated in FIGS. 1–9, like reference numerals being used to refer to like and corresponding parts of the various drawings.

Figure 1:
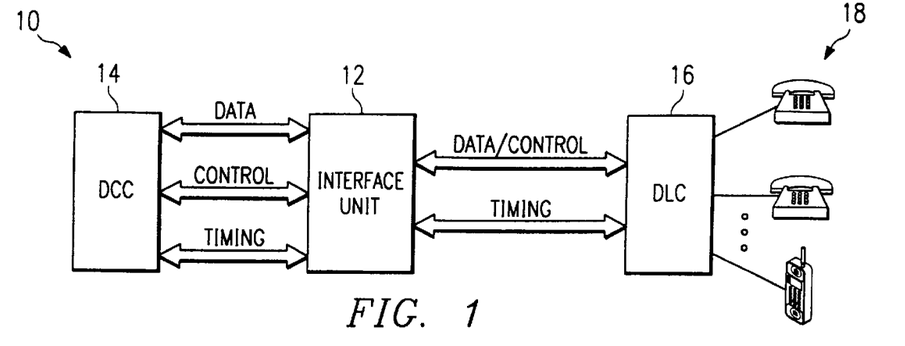
FIG. 1 is a top level block diagram of an interface unit constructed according to the teachings of the present invention being coupled between a digital cross-connect (DCS) and a digital loop carrier (DLC)

Referring to FIG. 1, a top level block diagram of an end office digital cross-connect system 10 is shown. End office digital cross-connect system 10 includes an interface unit 12, which is coupled between a digital cross-connect system 14 and a digital loop carrier 16. Digital loop carrier 16 is further coupled to subscriber equipment 18 via subscriber lines. Digital loop carriers are typically implemented as a stand-alone host terminal or a central office terminal connected to at least one remote terminal, where the central office terminal is typically positioned in the central office and the remote terminals are typically placed in the end office. Digital loop carrier 16 of FIG. 1 may be a host terminal or a remote terminal, which is under the control of digital cross-connect system 14. Just as multiple remote terminals may be coupled to a single central office terminal in a typical digital loop carrier, multiple digital loop carriers 16 and respective interface units 12 may be coupled to digital cross-connect system 14.

Interface unit 12 provides a gateway function for data, control, and timing signals between cross-connect system 14 and digital loop carrier 16. This is necessary because digital cross-connects and digital loop carriers normally operate in different environments and are typically implemented without considerations of compatibility with one another. In providing an interface unit 12, much of the original implementation in digital cross-connect 14 and digital loop carrier 16 need not be altered, according to the present invention. The teachings of the present invention are, in particular, applicable to a DEXCS digital cross-connect system and a Litespan® digital loop carrier, both manufactured by DSC Communications Corporation of Plano, Tex.

Figure 2:
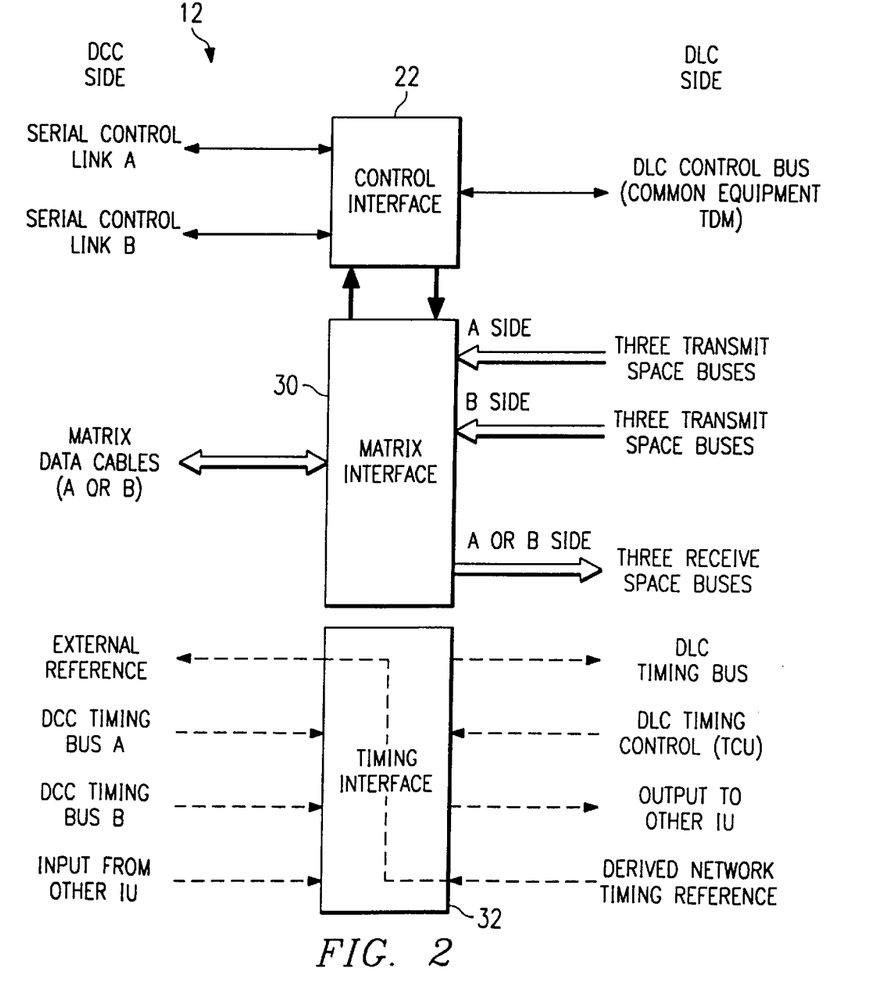
FIG. 2 is a simplified block diagram of an embodiment of the interface unit according to the teachings of the present invention.

Referring to FIG. 2, interface unit 12 may be divided into three functional blocks: control interface 22, matrix interface 30, and timing interface 32. Control interface 22 is coupled to the control subsystem of digital cross-connect 14 via serial control links, where the A and B designation refers to the two redundant plane fail-safe architecture that is typical of telecommunications equipment manufactured by DSC Communications Corporation. On the digital loop carrier side, the equipment control bus is received by control interface 22 and is electrically terminated. Some emulation by control interface 22 may be required to assure digital loop carrier 16 that it is still coupled to a central office terminal and that operating conditions are normal. In effect, digital loop carrier 16 is under the control of digital cross-connect system 14.

Matrix interface 30 is the functional block that provides the signal and data formatting and mapping between digital cross-connect system 14 and digital loop carrier 16. Matrix interface 30 performs pulse code modulation (PCM) data mapping between the digital cross-connect system's sixteen-bit parallel data word format and the digital loop carrier's eight-bit wide space bus format. As described in more detail below, the space buses are the matrix fabric of digital loop carrier 16. In one embodiment, the difference in timing and data rates in digital cross-connect system 14 and digital loop carrier 16 is interfaced by using dual port RAMs (DRAMs) in the inbound and outbound data paths. Interface unit 12 then uses a time slot interchange RAM-based architecture and method to facilitate the exchange of data in the dual port RAMs. Both fixed addressing and random addressing schemes in the dual port RAMs may be used.

Interface unit 12 further includes timing interface 32 that receives a derived network timing reference from digital loop carrier 16 and passes it to digital cross-connect system 14. Digital cross-connect system 14 may then uses the derived timing reference as an external timing reference to drive its own timing source. It may be seen that timing interface 32 receives timing signals on two timing buses A and B from digital cross-connect system 14, one of which is a redundant backup bus. Timing interface 32 also receives timing signals from the main and protect timing control units (TCUs), which are described in more detail below. Timing interface 32 is further coupled to digital loop carrier 16 via a timing bus for delivering timing signals thereto. When multiple digital loop carriers and their respective interface units are coupled to digital cross-connect system 14, the timing signals may be transmitted between the interface units in a daisy-chain like manner.

Figure 3:
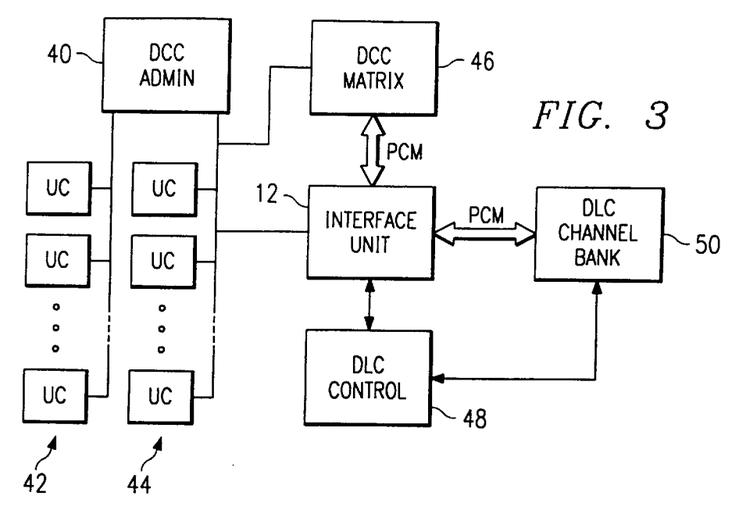
FIG. 3 is a simplified block diagram of an embodiment of the interface unit in relationship with components of the digital cross-connect and digital loop carrier according to the teachings of the present invention.

Referring to FIG. 3, digital cross-connect system 14 includes an administration (ADMIN) subsystem 40, which is coupled to a plurality of unit controllers (UCs) 42 and 44 via one or more buses. Administration subsystem 40 generally provides alarming processing and provisioning, craft access, timing and communication controls, and like administrative and control functions for digital cross-connect system 14. Unit controllers 42 and 44 are coupled with the network interfaces which receive digital telecommunications signals such as DS1 and DS3. Digital cross-connect administration subsystem 40 is further coupled to a matrix 46, which is preferably a single-stage, non-blocking time-slot interchange (TSI) cross-connecting signals at the DS0 level.

As shown in FIG. 3, interface unit 12 is coupled to administration subsystem 40 via one of the unit controller buses. Interface unit 12 is further coupled to a digital loop carrier control subsystem 48. Digital loop carrier control subsystem 48 is further coupled to at least one channel bank 50. Pulse code modulated signals are passed by interface unit 12 between matrix 46 and channel bank 50.

Because interface unit 12 is implemented primarily as an interface between two existing systems, interface unit 12 is preferably designed to mimic some existing component in the systems. In operation, interface unit 12 may appear much like a unit controller to administration subsystem 40, and receive control commands therefrom. Pulse code modulated signals are cross-connected in matrix 46 and passed to interface unit 12, which formats and maps the signal to a format accepted by digital loop carrier 16 and channel bank 50. In implementations where interface unit 12 substitutes for an existing circuit pack for either cross-connect system 14 and/or digital loop carrier 16, it may be necessary to supply emulation hardware and/or software (not shown) in interface unit 12 to ensure that both systems are fooled into being satisfied with the operations of the replaced circuit pack.

Figure 4:
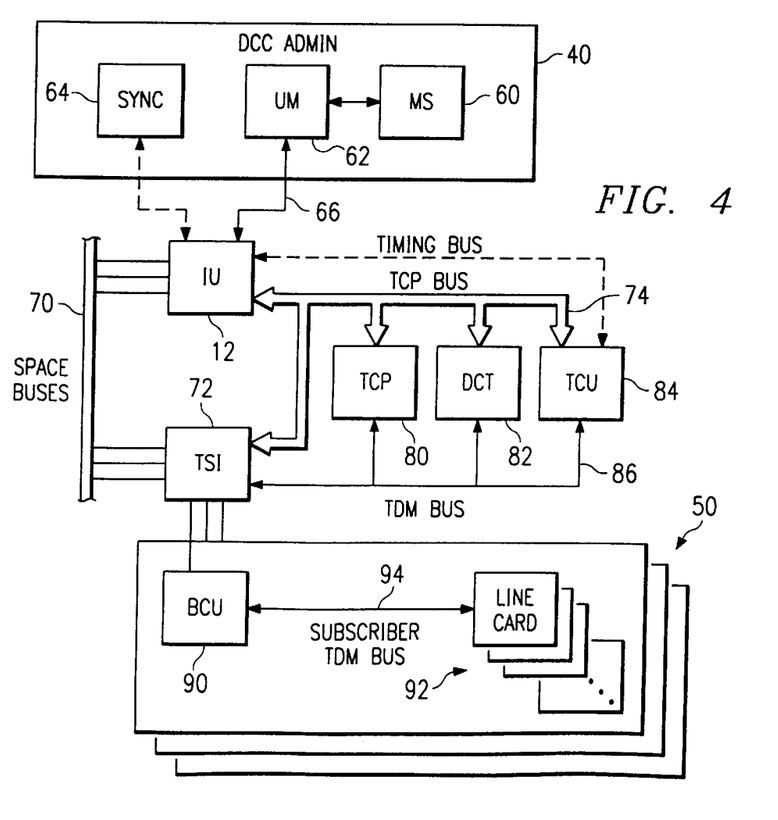
FIG. 4 is a more detailed block diagram of an embodiment of the interface unit in relationship with components of the digital cross-connect and digital loop carrier according to the teachings of the present invention.

Additional details are shown in FIG. 4. Digital cross-connect administration subsystem 40 may include a two-layered control architecture, which is comprised of a microprocessor system 60 and a unit manager 62. In certain applications, it may not be necessary to use a two-layered control architecture, and microprocessor system 60 may communicated directly with interface unit 12. Interface unit 12 is coupled to administration subsystem 40 via, for example, a serial link 66 at a predetermined data rate. Serial link 66 is used to send command messages from cross-connect system 14 to interface unit 12 and also to send messages from interface unit 12 back to cross-connect system 14. Because of the two-plane redundancy, this serial link also includes A and B portions. Serial link 66 may be implemented by a 19.2 Kbps RS-422 asynchronous communications path.

Timing reference signals for digital cross-connect system 14 are generated in a synchronization (SYNC) subsystem 64 in administration subsystem 40. Synchronization subsystem 64 is coupled to interface unit 12 to send and receive timing reference signals. A timing bus is further coupled between interface unit 12 and a timing control unit 84 of digital loop carrier 16.

Interface unit 12 is further coupled to several other components in digital loop carrier 16, including a terminal control processor (TCP) 80, a datalink and tone controller (DCT) 82, and a time slot interchanger (TSI) 72. A terminal control processor bus 74 is used as the communications medium between these components. Terminal control processor bus 74 may provide control, status, identification and communication through memory mapped registers. The primary functions of terminal control processor 80 is to provide the general control of the digital loop carrier and to provide arbitration among all the components on terminal control processor bus 74. Datalink and tone controller 82 generally provides the multi-channel subscriber datalink control, and multi-channel tone and signaling generation and receiving.

A time division multiplexing bus 86 further couples time slot interchanger 72, terminal control processor 80, datalink and tone controller 82, and time control unit 84.

Interface unit 12 and time slot interchanger 72 are further coupled to space buses 70, which together with time slot interchanger 72 previously perform the cross-connecting function in digital loop carrier 16. In end office digital cross-connect system 10, cross-connections are performed by matrix 46 (FIG. 3) and space buses 70 and time slot interchanger 72 of digital loop carrier 16 no longer perform this function. However, space buses 70 now function to couple interface unit 12 to digital loop carrier 16 for the communication of data signals to and from the network. Because the data signal format on space buses differ from that of digital cross-connect matrix 46, interface unit 12 has the necessary task of translation therebetween.

Time slot interchanger 72 is further coupled to channel banks 50. Channel banks are DS0 to DS1 or DS0 to E1 multiplexing equipment to pulse code modulate subscriber. More specifically, time slot interchanger 72 is coupled to a bank control unit (BCU) 90, which generally provides the interface to line cards 92 via a subscriber time division multiplexing bus 94. Line cards may operate at DS1 and DS0 rates, as well as international rates such as E1, and interface directly with the subscriber lines.

It should be noted that all components shown in FIG. 4 have a redundant twin to provide a fail-safe system. However, the redundancy is not shown explicitly in order to provide clarity in the block diagram.

In operation, a frame reference is derived from network signals by line card 92 and passed to synchronization subsystem 64 via the timing bus and interface unit 12. Synchronization subsystem 64, receiving the derived network timing reference as an external reference, uses it to generate timing signals for digital cross-connect system 14. The timing signals are also distributed to all of its subsystems, including interface unit 12. Within digital loop carrier 16, the two redundant planes may be implemented to operate independently, where as in digital cross-connect system 14, the two planes are synchronized. Interface unit 12 makes a comparison between the redundant timing signals from synchronization subsystem 64 and the timing signals on the timing bus of digital loop carrier 16, and provides a feedback signal to digital loop carrier 16 to advance or delay its redundant system timing signals accordingly. In this manner, the two planes of digital loop carrier 16 are brought into alignment to minimize inter-operation timing issues with digital cross-connect system 14. In effect, digital cross-connect 14 drives the timing of digital loop carrier 16.

Interface unit 12 receives and transmits data from both planes of digital cross-connect matrix 46 (FIG. 3), and also has access to inbound pulse code modulated data on both planes of digital loop carrier 16. In the inbound direction, pulse code modulated data and signaling from the network is received by line card 92, multiplexed and formatted to internal digital loop carrier format, and passed from the active plane of digital loop carrier 16, through space buses 70, to interface unit 12. Interface unit 12 converts the pulse code modulated data to the digital cross-connect matrix format, and sends them to both A and B matrix planes of digital cross-connect matrix 46.

In the outbound direction from the matrix, the pulse code modulated data in the matrix format is remapped by interface unit 12 to the digital loop carrier format and passed to the active plane of digital loop carrier 16 through space buses 70 and time slot interchanger 72. Received by channel banks 50, the pulse code modulated data is then converted into the appropriate network format at the line cards 92.

In end office digital cross-connect system 10 of the present invention, several data and signaling format conversions take place. One is between matrix 46 (FIG. 3) and space buses 70 (FIG. 4), the other is between subscriber time division multiplexing bus 94 and network signals. Each conversion is discussed in more detail below.

Interface unit 12 provides the rate conversion, slip buffering, and format conversion from the matrix payload data and signaling format to the space bus format. Inbound space bus data is retimed, demultiplexed, and aligned in preparation for storage into separate data and signaling dual port RAMs (not shown) capable of supporting the rate conversion required. The data dual port RAMs are emptied on the digital cross-connect system side and passed directly to the matrix. Parallel space bus signaling is accumulated over the entire space bus superframe, serialized, and passed out-slot to the matrix. In the outbound direction, matrix data is buffered in outbound dual port RAMs (not shown) and written directly onto the space buses after a rate conversion. Signaling is accumulated and processed over the matrix superframe and written in parallel format in-slot onto the space buses.

In particular, the matrix data format is a sixteen bit parallel data word where the lower eight bits contain pulse code modulated data bits, and the upper eight bits contain the overhead bits. The overhead bits include a signaling bit, a framing bit, a trunk conditioning indicator (TCI), a path identifier, and a parity bit. Some of the overhead bits are extracted from the network data stream, such as the framing and signaling bits, and others are generated internally by digital cross-connect system 14, such as the path identifier and parity bit.

The space bus format may consist of two byte-wide sets of 1024 time interleaved time slots. The 1024 time slots are divided into sixteen groups, where each group contains 32 data channels. There are seven eight-bit parallel space buses, three receive, three transmit, and one for local connections. Each of the seven space buses contain 896 time slots for carrying data and 128 time slots for carrying signaling.

The digital cross-connect matrix and unit controllers operate on a logical space into which 28 DS1 signals or one DS3 signal may be mapped. Each column is comprised of 24 DS0s to make up a DS1, and there are 28 DS1 signals in the mapping diagram in FIG. 5. The DS0 numbering system used in the drawing figures, "DS0-XX,Y", indicate the XXth DS0 signal of the Yth DS1 signal. For emphasis, the even numbered time slots are shaded.

When E1 line cards are employed, a mapping between E1 and DS1 signals are needed. Referring to FIG. 6, a mapping diagram to accommodate 14 E1 signals, each comprised of 32 DS0s, into the same 28-DS1 logical space is shown. It may be seen that the bandwidth used to carry two DS1 signal is needed to carry an E1 signal. The bandwidth of one DS1 carries 24 of the 32 DS0 signals, while the bandwidth of the second DS1 carries the remaining eight DS0 signals. The DS0 numbering system used in the drawing figures, "DS0-XX,Y", indicate the XXth DS0 signal of the Yth E1 signal. The even numbered time slots are shaded for emphasis.

FIG. 7 shows the mapping of 21 E1 signals into the same 28-DS1 logical space. It may be seen that the DS0s for the first three E1 (E1-1, E1-2, E1-3) signals are interleaved or multiplexed in the second column in a predetermined manner. In particular, in the exemplary mapping shown in FIG. 7, the 00th, 04th, 08th, 12th, 16th, 20th, 24th, and 28th DS0 signals of E1-1 through E1-3 signals are mapped to the second column, while the remaining DS0 signals for the E1-1, E1-2, and E1-3 signals are mapped to columns one, three, and four, respectively. This pattern is repeated accordingly, until all 21 E1 signals are mapped. Constructed in this manner, all available bandwidth in the matrix is fully utilized. The even numbered time slots are shaded for emphasis and clarity.

Figure 8A:
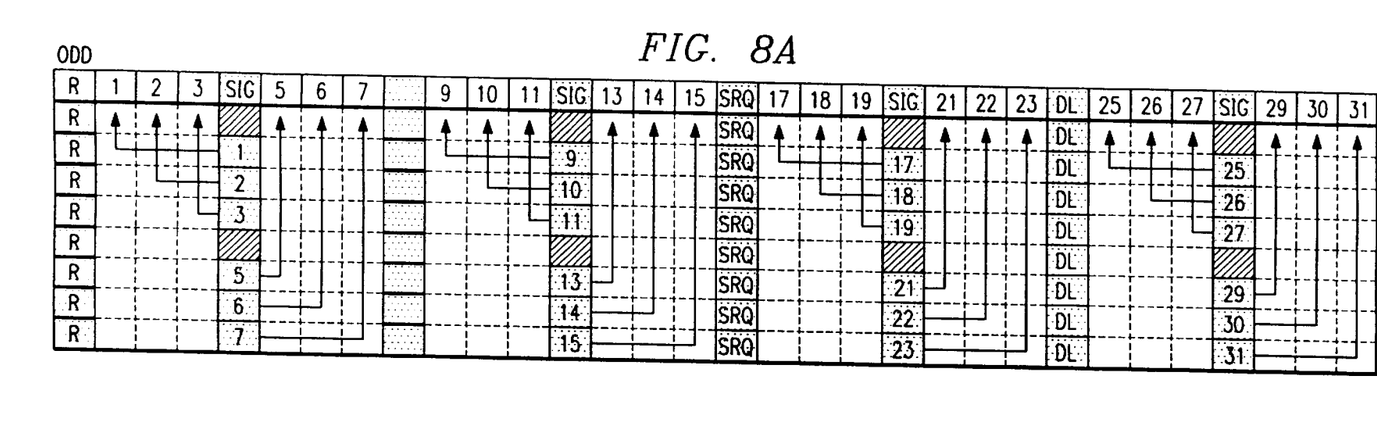
FIGS. 8A and 8B are exemplary mapping diagrams of mapping E1 into a subscriber bus.
Figure 8B:
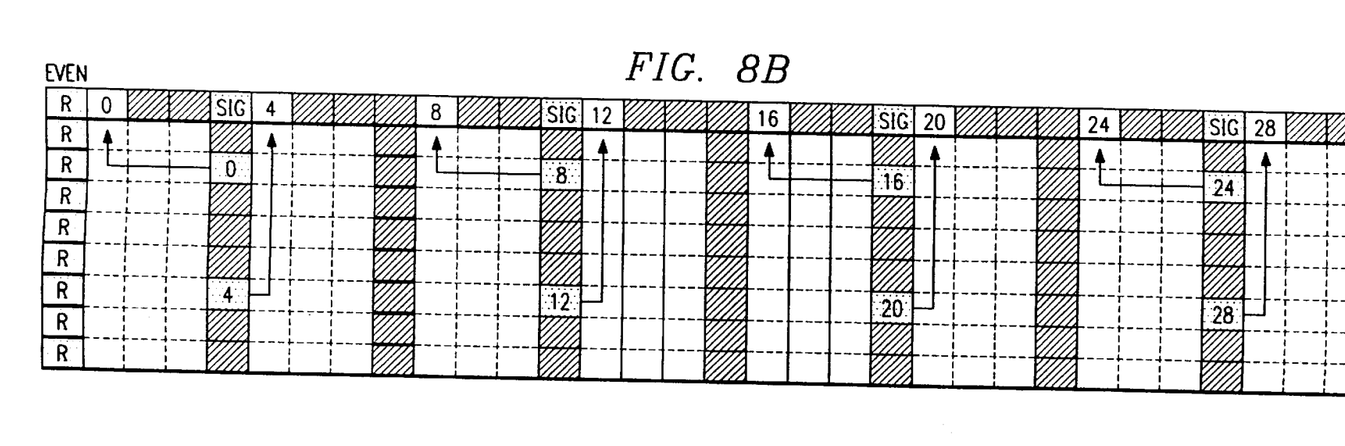

To interface with E1 line cards and to carry the E1 signal on subscriber time division multiplexing bus 94 (FIG. 4), a mapping scheme is devised for the subscriber bus. FIGS. 8A and 8B are exemplary mapping diagrams for carrying the E1 signal on a bus having two bit-interleaved subscriber data time slots, because the 24 available DS0 bandwidth in the original bus format is inadequate.

In the mapping shown in FIGS. 8A and 8B, two 2.048 Mbps data streams, termed "ODD" and "EVEN" sides, are used to carry one complete E1 signal, which is 32 DS0 signals per 125 μsec frame. Two bit-interleaved halves of a single subscriber bus or the "ODD" half of two subscriber buses may be used to carry the E1 signal. Each "ODD" and "EVEN" side carries eight frames or one superframe of 32 channels or time slots. In the FIGURES, the symbol "R" denotes a reserved slot; the symbol "SIG" denotes a slot used for signaling; the symbol "SRQ" denotes systems communications service request channel; and the symbol "DL" denotes data link. In the signaling time slots of each frame, the numerals indicate the channels for which the signaling is for. For example, in frame number two, the fourth time slot (counting R or reserved time slots as column zero) or the first signaling time slot of frame number one carries the signaling for channel one.

Figure 9A:
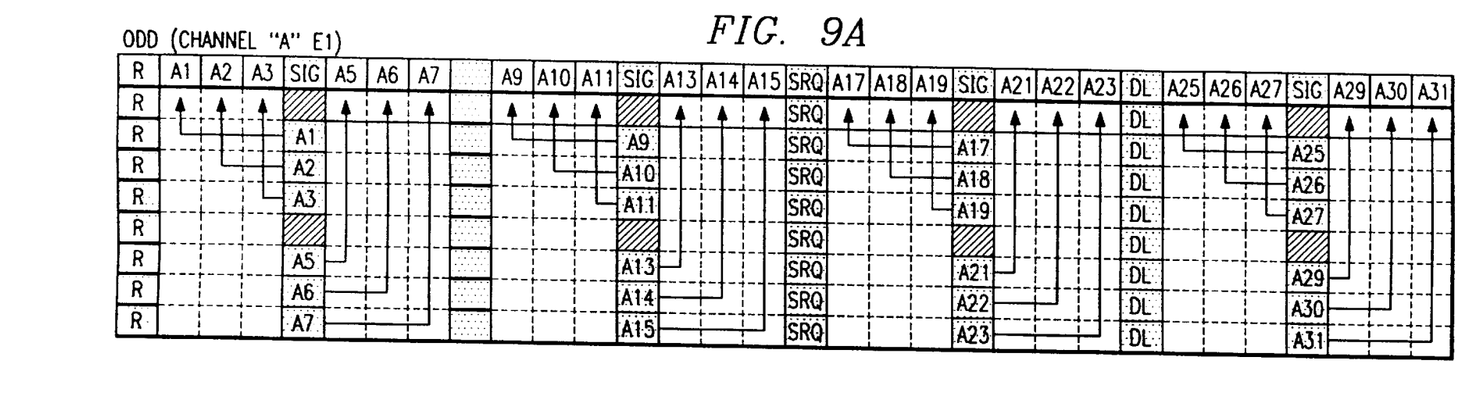
FIGS. 9A–9D are exemplary mapping diagrams of mapping high density E1 signals into a subscriber interface bus.
Figure 9B:
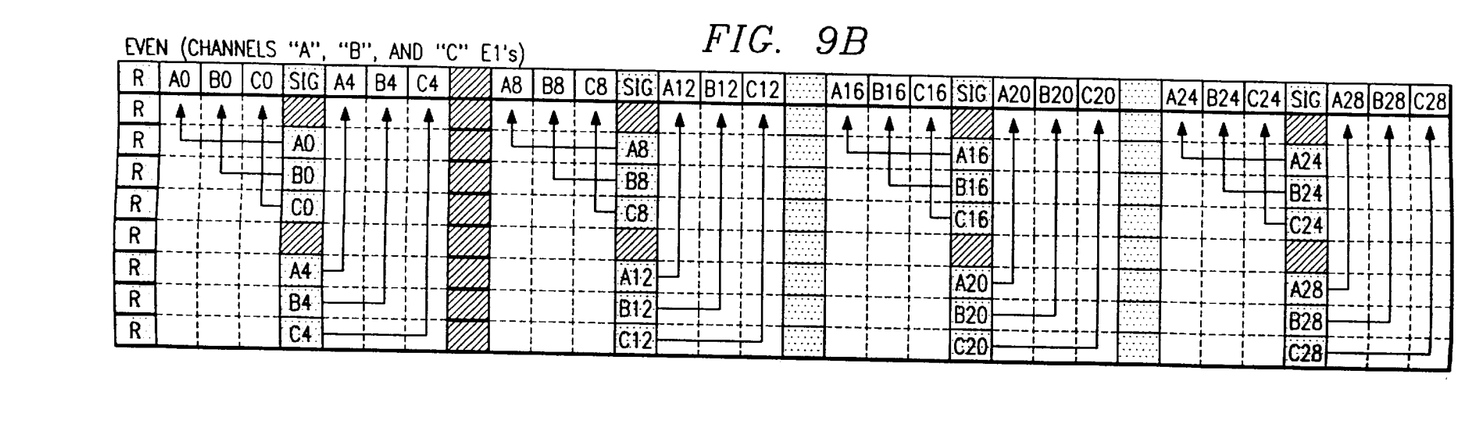
Figure 9C:
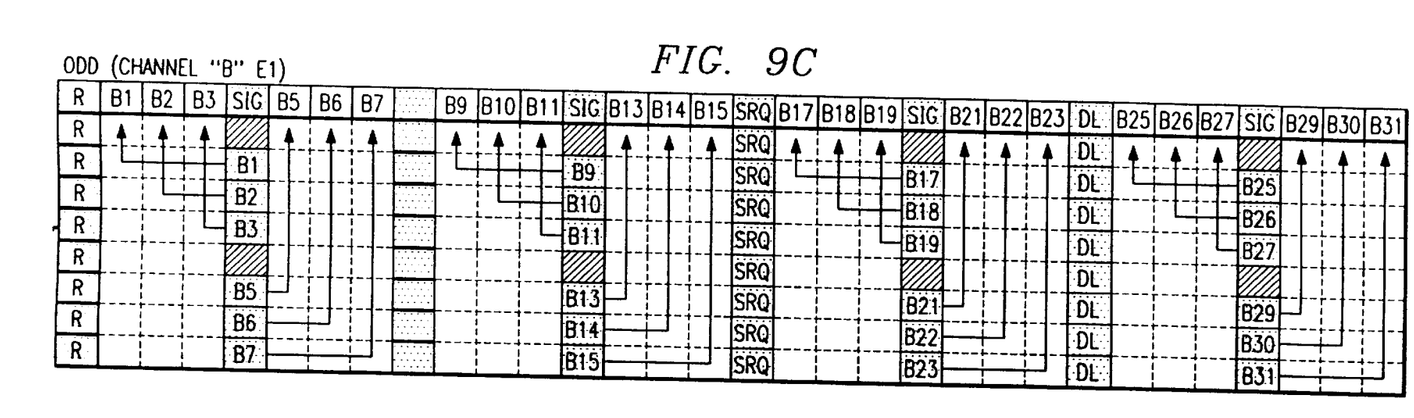
Figure 9D:
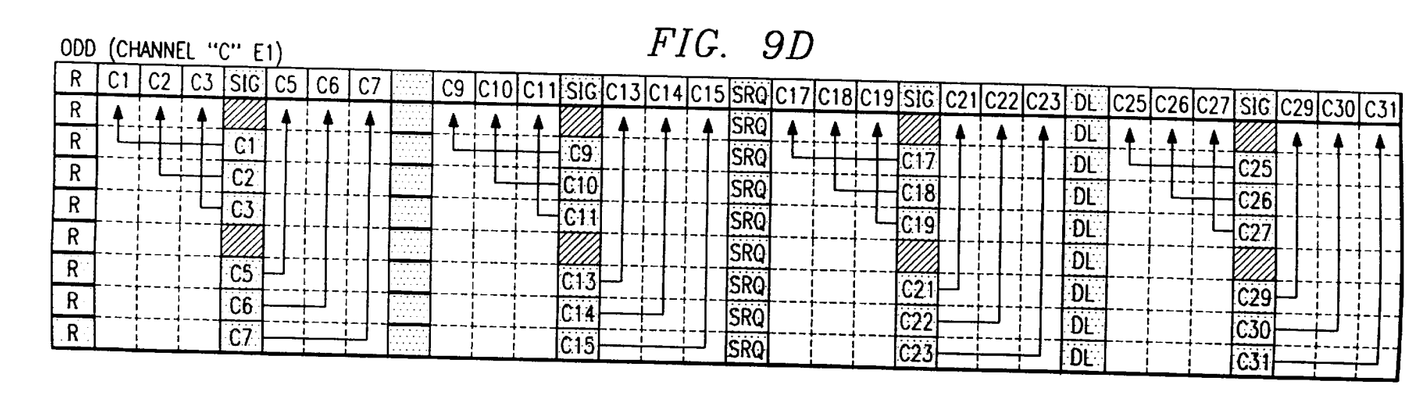

In order to accommodate the high density E1 application in an efficient manner, the mapping scheme shown in FIGS. 9A through 9D is provided. This format uses four 2.048 Mbps data streams to provide 8 Mbps of traffic capacity. Thus, four subscriber buses are used to carry three E1 signals, which a e denoted as A, B, and C E1 signals. Three of the subscriber buses follow the same format as the "ODD" side mapping scheme shown in FIG. 8A. These "ODD" side subscriber buses are shown in FIGS. 9A, 9C, and 9D, for E1 channels A, B, and C, respectively. The fourth subscriber bus, shown in FIG. 9B, carries the remaining time slots and respective signaling of all three E1 signals. Similar to the mapping scheme shown in FIGS. 8A and 8B, data and signaling for the 0th, 4th, 8th, 12th, 16th, 20th, 24th, and 28th are carried in this superframe.

This high E1 density mapping scheme on the subscriber bus between line cards 92 and bank control unit 90 (both shown in FIG. 4) is mirrored in the mapping scheme between matrix 46 (FIG. 3) and space buses 70 (FIG. 4), which is shown in FIG. 7. Therefore, the two mapping schemes are consistent. It may be also seen that because the mapping schemes between the high density applications are compatible with the mapping schemes of lower density applications, the circuit packs implementing the two mapping schemes may be interchangeable and/or coexist in the same system.

Alternatively, two subscriber buses may be used to transport the A, B, and C E1 signals by mapping the E1 signals into both "ODD" and "EVEN" sides of the buses. As a result, the first subscriber bus carries the A E1 signal as well as the signaling for all three E1 signals, and the second subscriber bus carries the B and C E1 signals. When this mapping scheme is employed, FIGS. 9A and 9B depict the "ODD" and "EVEN" sides of the first subscriber bus, and FIGS. 9C and 9D depict the "ODD" and "EVEN" sides of the second subscriber bus.

Although the present invention and its advantages have been described in detail, it should be understood that various changes, substitutions and alterations can be made therein without departing from the spirit and scope of the invention as defined by the appended claims.

What is claimed is:

1. An automated method for mapping E1 signals into a matrix space, comprising the steps of:
   defining the matrix space as having a predetermined number of DS1 signals;
   receiving a first E1 signal, the first E1 signal having 32 channels corresponding to 32 DS0 signals;
   collecting 24 selected DS0 signals within the first E1 signal into a first DS1 signal in the matrix space;
   collecting remaining 8 DS0 signals within the first E1 signal into a second DS1 signal in the matrix space; and
   continuing the two collecting steps until the DS1 spaces in the matrix space are filled.

2. The method, as set forth in claim 1, wherein the first collecting step comprises the step of selecting DS0-1 to DS0-3, DS0-5 to DS0-7, DS0-9 to DS0-11, DS0-13 to DS0-15, DS0-17 to DS0-19, DS0-21 to DS0-023, DS0-25 to DS0-27, and DS0-29 to DS0-31 signals of the first E1 signal to be mapped into the first DS1 signal in the matrix space.

3. The method, as set forth in claim 2, wherein the second collecting step comprises the step of selecting DS0-0, DS0-4, DS0-8, DS0-12, DS0-16, DS0-20, DS0-24, and DS0-28 signals of the first E1 signal to be mapped into the second DS1 signal in the matrix space.

4. The method, as set forth in claim 1, wherein the second collecting step further comprises the step of mapping the remaining eight DS0 signals of the first E1 signal into predetermined time slots of the second DS1 signal.

5. The method, as set forth in claim 4, wherein the second collecting step further comprises the step of mapping the remaining eight DS0 signals into the predetermined that in the slots that include 1st, 4th, 7th, 10th, 13th, 16th, 19th, and 22nd time slots of the second DS1 signal.

6. The method, as set forth in claim 1, wherein the continuing collecting step comprises the step of continuing collecting selected DS0 signals until 14 E1 signals fill the matrix space.

7. The method, as set forth in claim 1, wherein the matrix space defining step comprises the step of defining the matrix space sufficient to carry 28 DS1 signals.

8. The method, as set forth in claim 1, further comprising the step of collecting the mapped E1 signals from the matrix space into E1 signals.

9. Apparatus for mapping E1 signals into a matrix space, comprising:
   a matrix interface for defining the matrix space as having a predetermined number of DS1 signals, the matrix interface receiving a first E1 signal, mapping 24 selected DS0 signals within the first E1 signal into a first DS1 signal in the matrix space, mapping remaining 8 DS0 signals within the first E1 signal into a second DS1 signal in the matrix space, and continuing mapping until the DS1 spaces in the matrix space are filled.

10. The apparatus, as set forth in claim 9, wherein the matrix interface comprises means for selecting DS0-1 to DS0-3, DS0-5 to DS0-7, DS0-9 to DS0-11, DS0-13 to DS0-15, DS0-17 to DS0-19, DS0-21 to DS0-023, DS0-25 to DS0-27, and DS0-29 to DS0-31 signals of the first E1 signal to be mapped into the first DS1 signal in the matrix space.

11. The apparatus, as set forth in claim 9, wherein the matrix interface comprises means for mapping DS0-0, DS0-4, DS0-8, DS0-12, DS0-16, DS0-20, DS0-24, and DS0-28 signals of the first E1 signal into the second DS1 signal in the matrix space.

12. The apparatus, as set forth in claim 9, wherein the matrix interface comprises means for mapping the remaining eight DS0 signals into predetermined time slots of the second DS1 signal including the 1st, 4th, 7th, 10th, 13th, 16th, 19th, 22nd time slots.

13. The apparatus, as set forth in claim 9, wherein the matrix interface comprises means for continuing mapping until 14 E1 signals fill the matrix space.

14. The apparatus, as set forth in claim 9, wherein the matrix interface comprises means for defining the matrix space sufficient to carry 28 DS1 signals.

15. An automated method for mapping E1 signals into a logical space defined as having a predetermined number of DS1 signals, comprising the steps of:
    receiving a first E1 signal;
    collecting 24 selected DS0 signals within the first E1 signal into a first DS1 signal in the logical space;
    collecting remaining eight DS0 signals within the first E1 signal into a second DS1 signal in the logical space; and
    continuing the two collecting steps until the predetermined number of DS1 signals in the logical space are filled.

16. The method, as set forth in claim 15, wherein the first collecting step comprises the step of selecting DS0-1 to DS0-3, DS0-5 to DS0-7, DS0-9 to DS0-11, DS0-13 to DS0-15, DS0-17 to DS0-19, DS0-21 to DS0-023, DS0-25 to DS0-27, and DS0-29 to DS0-31 signals of the first E1 signal to be mapped into the first DS1 signal in the logical space.

17. The method, as set forth in claim 16, wherein the second collecting step comprises the step of selecting DS0-0, DS0-4, DS0-8, DS0-12, DS0-16, DS0-20, DS0-24, and DS0-28 signals of the first E1 signal to be mapped into the second DS1 signal in the logical space.

18. The method, as set forth in claim 15, wherein the second collecting step further comprises the step of mapping the remaining eight DS0 signals into predetermined time slots of the second DS1 signal including the 1st, 4th, 7th, 10th, 13th, 16th, 19th, 22nd time slots.

19. The method, as set forth in claim 15, wherein the continuing collecting step comprises the step of continuing collecting selected DS0 signals until 14 E1 signals fill the logical space.

20. The method, as set forth in claim 15, wherein the continuing collecting step comprises the step of continuing collecting selected DS0 signals until a predetermined number of E1 signals fill the logical space, wherein the predetermined number of DS1 signals is 28 DS1 signals.

21. The method, as set forth in claim 15, further comprising the step of mapping the E1 signals mapped into DS1 signals in the logical space into respective E1 signals.

* * * * *